(12) United States Patent
Moldthan

(10) Patent No.: US 7,306,005 B2
(45) Date of Patent: Dec. 11, 2007

(54) VALVE AND VALVE CARTRIDGE

(75) Inventor: Jason R. Moldthan, Greer, SC (US)

(73) Assignee: T&S Brass and Bronze Works, Inc., Travelers Rest, SC (US)

( * ) Notice: Subject to any disclaimer, the term of this patent is extended or adjusted under 35 U.S.C. 154(b) by 105 days.

(21) Appl. No.: 11/300,656

(22) Filed: Dec. 14, 2005

(65) Prior Publication Data

US 2007/0131288 A1   Jun. 14, 2007

(51) Int. Cl.
*F16K 27/00* (2006.01)
(52) U.S. Cl. .................................. 137/454.6
(58) Field of Classification Search ............. 137/454.6, 137/625.33
See application file for complete search history.

(56) References Cited

U.S. PATENT DOCUMENTS

| | | | | |
|---|---|---|---|---|
| 1,640,527 | A | * | 8/1927 | Brown ..................... 137/454.6 |
| 1,782,758 | A | * | 11/1930 | Gavin ...................... 137/454.6 |
| 1,856,664 | A | * | 5/1932 | Steen ....................... 137/454.6 |
| 1,988,966 | A | * | 1/1935 | Eckhouse ................. 137/454.6 |
| 2,561,559 | A | * | 7/1951 | Brown ..................... 137/454.6 |
| 3,326,510 | A | * | 6/1967 | Kolze .......................... 251/11 |
| 3,523,551 | A | * | 8/1970 | Schmitt ................... 137/454.6 |
| 4,156,519 | A | | 5/1979 | Janz et al. |
| 4,305,423 | A | * | 12/1981 | Adler .................... 137/505.13 |
| 5,316,039 | A | | 5/1994 | Haag et al. |
| 6,363,964 | B1 | * | 4/2002 | Carroll ................... 137/505.41 |

* cited by examiner

*Primary Examiner*—John Fox
(74) *Attorney, Agent, or Firm*—Dority & Manning, P.A.

(57) ABSTRACT

A faucet valve cartridge includes a valve seat with a co-molded proximal end. The cartridge regulates flow in a faucet valve and provides a floating sealing arrangement with the valve seat of the faucet valve.

6 Claims, 10 Drawing Sheets

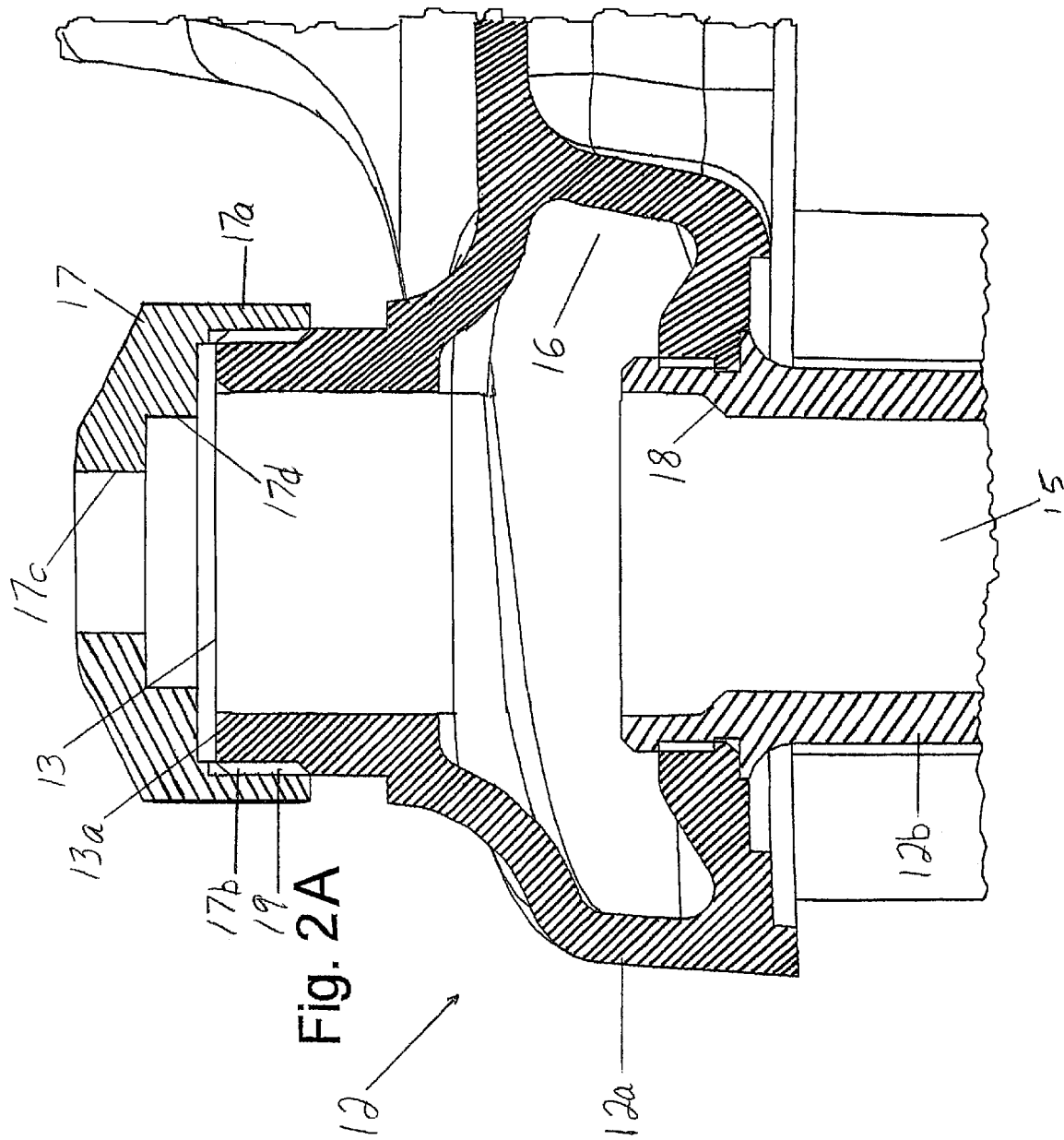

VALVE AND VALVE CARTRIDGE

CROSS-REFERENCE TO RELATED APPLICATIONS

N/A

STATEMENT REGARDING FEDERALLY SPONSORED RESEARCH OR DEVELOPMENT

N/A

BACKGROUND OF THE INVENTION

An example of an arrangement for achieving the seal between a valve cartridge and the valve body is disclosed in U.S. Pat. No. 5,316,039. This type of arrangement is known as a static sealing arrangement wherein the amount of deformation of a seal 32 is predetermined and controlled by the position where the abutment of the lower surface 30 of the flange 28 with the housing 12 will occur. In this type of static sealing arrangement, the sealing properties of seal 32 do not depend on the amount of torque that is applied to nut 20. The position of the cartridge sleeve 36 (and the seal 32 held by the valve seat 48 that is attached to the sleeve 36) remains the same regardless of how much the nut 20 is tightened. Abutment of the lower surface 30 of the flange 28 with the housing 12 serves as a stop to prevent the deformable seal 32 from being deformed beyond a predetermined amount of deformation that otherwise would occur if the cartridge sleeve 36 moved any further into the housing toward the cartridge seat 34. Additionally, the stop that is provided by the abutting relation of the flange 28 to the valve housing 12 also coincides with the position that the deformable seal 32 must assume in order to ensure that the seal 32 is deformed sufficiently to provide a static seal between the cartridge sleeve 36 and the cartridge seat 34. Thus, the abutment of the lower surface 30 of the flange 28 occurs at that point deemed proper for providing the desired predetermined amount of deformation of seal 32 when the cartridge 18 is assembled within housing 12.

These precise relationships require the maintenance of tight tolerances in machining the various parts and in their assembly. Any deviation from these tolerances results in a leaking seal, and the cartridge must be replaced, resulting in significant waste of material and labor.

OBJECTS AND SUMMARY OF THE INVENTION

It therefore is a principal object of the present invention to provide an improved valve and valve cartridge therefor.

It is another principal object of the present invention to provide an improved sealing arrangement between the valve body and the valve cartridge therefor.

It is a further principal object of the present invention to provide a valve and valve cartridge therefor that requires less stringent dimensional tolerances and therefore is more economically made than conventional devices.

Additional objects and advantages of the invention will be set forth in part in the description that follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a faucet valve cartridge is provided for controlling flow through a faucet valve that includes valve, housing, which has an inlet, an outlet and defines a cartridge seat interposed between the inlet and outlet. The cartridge seat is configured for cooperating with a portion of the cartridge in order to provide a floating seal between the inlet and outlet of the valve housing.

The cartridge desirably includes a sleeve, a valve stem, a seal piece and a valve seat. The sleeve elongates in an axial direction and defines a proximal end and a distal end disposed opposite the proximal end in the axial direction. The sleeve defines an opening at the proximal end to permit insertion of the valve stem into the sleeve. The sleeve defines an entrance for communicating with the inlet of the valve housing and to allow the valve stem to pass through the sleeve. The sleeve defines an exit for communicating with the outlet of the valve housing. The sleeve defines a flow passage elongating in a direction generally transverse to the axial direction and connecting the entrance and the exit of the sleeve. The sleeve defines an interior channel that extends in the axial direction from the opening through the passage and to the entrance of the sleeve. The sleeve defines a floating seating surface adjacent the distal end of the sleeve.

The valve stem defines a proximal end and a distal end disposed opposite said proximal end in the axial direction. The valve stem is mounted within the interior channel of the sleeve and is longitudinally movable between a closed position and an open position. The valve stem has a reduced diameter portion that can be disposed in the passage of the sleeve.

The valve seat defines a proximal end and a distal end opposite the proximal end. The proximal end of the valve seat defines a conical section and a cylindrical section that extends from the largest diameter portion of the conical section. The proximal end of the valve seat includes a non-elastomeric tongue. The tongue of the proximal end of the valve seat is encased within an elastomeric layer. The floating seat at the distal end of the cartridge body is received against a portion of the inner surface of the elastomeric layer of the proximal end of the valve seat so as to provide a floating sealing engagement with the valve seat. A portion of the elastomeric layer of the proximal end of the valve seat is configured to be received against and deformed into sealing engagement with the cartridge seat of the valve housing so as to provide a floating sealing engagement with the cartridge seat.

The seal piece is mounted on the distal end of the valve stem and is configured for sealing engagement with the distal end of the valve seat. The seal piece is engaged with the distal end of the valve seat only in the closed position for preventing flow to the entrance and passage of the cartridge sleeve.

The accompanying drawings, which are incorporated in and constitute a part of this specification, illustrate at least one presently preferred embodiment of the invention as well as some alternative embodiments. These drawings, together with the description, serve to explain the principles of the invention but by no means are intended to be exhaustive of all of the possible manifestations of the invention.

BRIEF DESCRIPTION OF THE DRAWINGS

FIG. 2A is a different vertical sectional view of the valve of FIG. 1, but enlarged and showing only a portion of what is shown of the valve in FIG. 1.

DETAILED DESCRIPTION OF THE PREFERRED EMBODIMENTS

Reference now will be made in detail to the presently preferred embodiments of the invention, one or more examples of which being illustrated in the accompanying drawings. Each example is provided by way of explanation of the invention, which is not restricted to the specifics of the examples. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The same numerals are assigned to the same components throughout the drawings and description.

Figure 1:
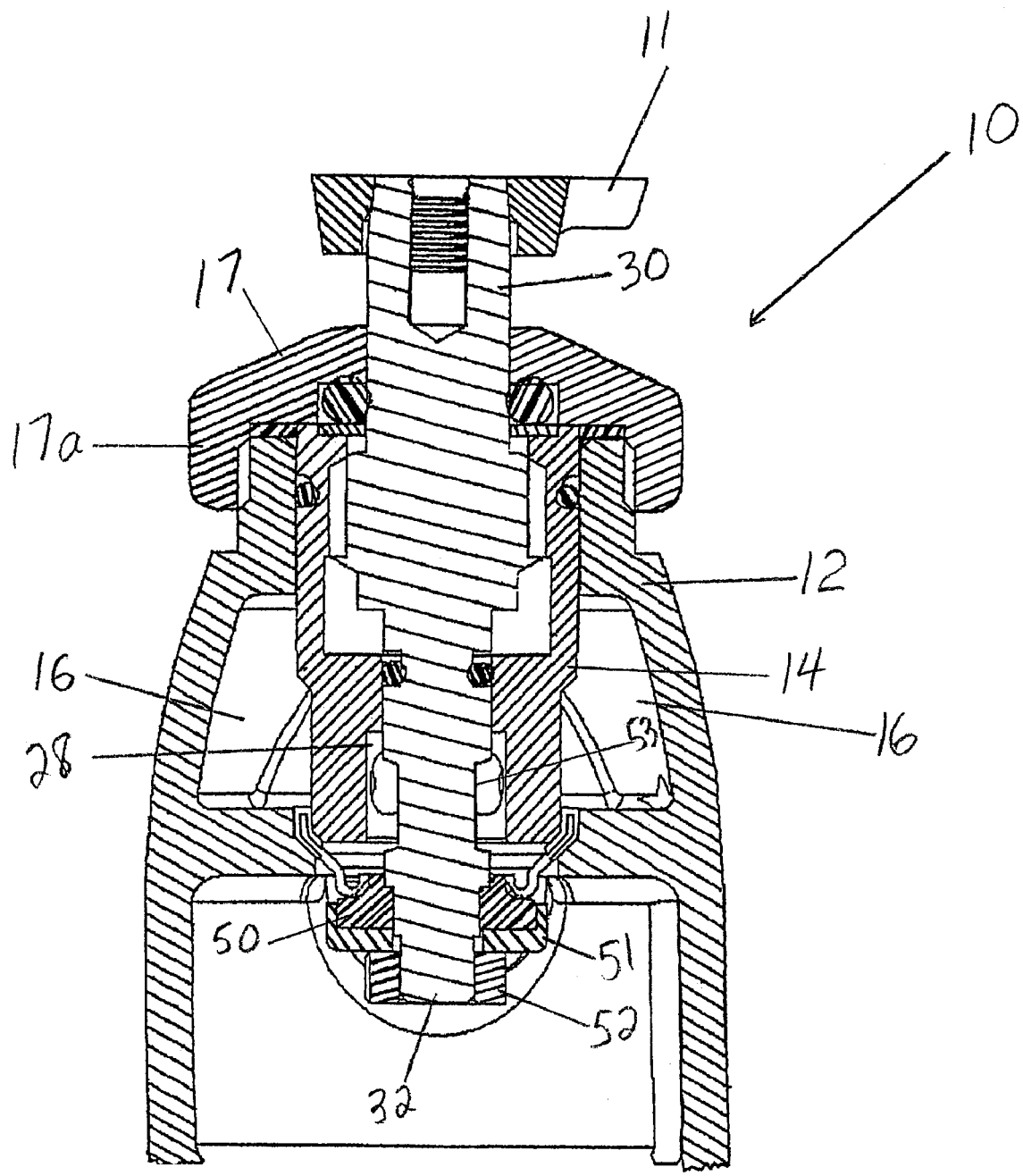
FIG. 1 is a fragmentary, vertical sectional view of one embodiment of the improved valve, shown in a closed position.

As embodied herein and shown in cross-section in FIG. 1 for example, a faucet valve 10 for controlling flow through a faucet comprises a valve housing 12 and a valve cartridge 14. The valve cartridge 14 is at least partially disposed within the valve housing 12. An embodiment of the faucet valve cartridge 14 is shown in the closed position in FIG. 3A, where the cross-section is taken in a different plane than the plane of the cross-section of FIG. 1.

As shown in FIG. 2A for example, the valve housing 12 can comprise two separate structures, an upper section 12a and a lower section 12b, which are integrated together to form housing 12. In the embodiment shown in FIG. 2A, the exterior surface of the proximal end of the lower section 12b is provided with threads that can be screwed into mating threads formed in the interior surface of the distal end of the upper section 12a. The valve housing 12 defines an opening 13 at the proximal end of the valve housing 12. The valve housing 12 defines a proximal edge 13a that forms a free edge surface at the opening 13. The opening 13 is configured so that the cartridge 14 can be inserted into the valve housing 12 through the opening 13 of the valve housing 12. The valve housing 12 defines a hollow conduit that begins at the opening 13 and elongates in the vertical direction, which is also the axial direction, toward the distal end of the lower section 12b. The conduit of the valve housing 12 has a proximal end at the opening 13, a distal end and an intermediate section that is disposed between the proximal end and the distal end.

As shown in FIG. 2A for example, the valve housing 12 defines an inlet 15, an outlet 16 and a cartridge seat 18. The inlet 15 of the valve housing 12 is disposed towards the distal end of the valve housing 12. The outlet 16 of the valve housing 12 is disposed in the intermediate section of the valve housing. The cartridge seat 18 is interposed between the inlet 15 and the outlet 16 of the valve housing 12. The cartridge seat 18 of the valve housing 12 is configured for cooperating with a portion of the cartridge 14 in order to provide a water-tight seal between the inlet 15 and outlet 16 of the valve housing 12.

Figure 3A:
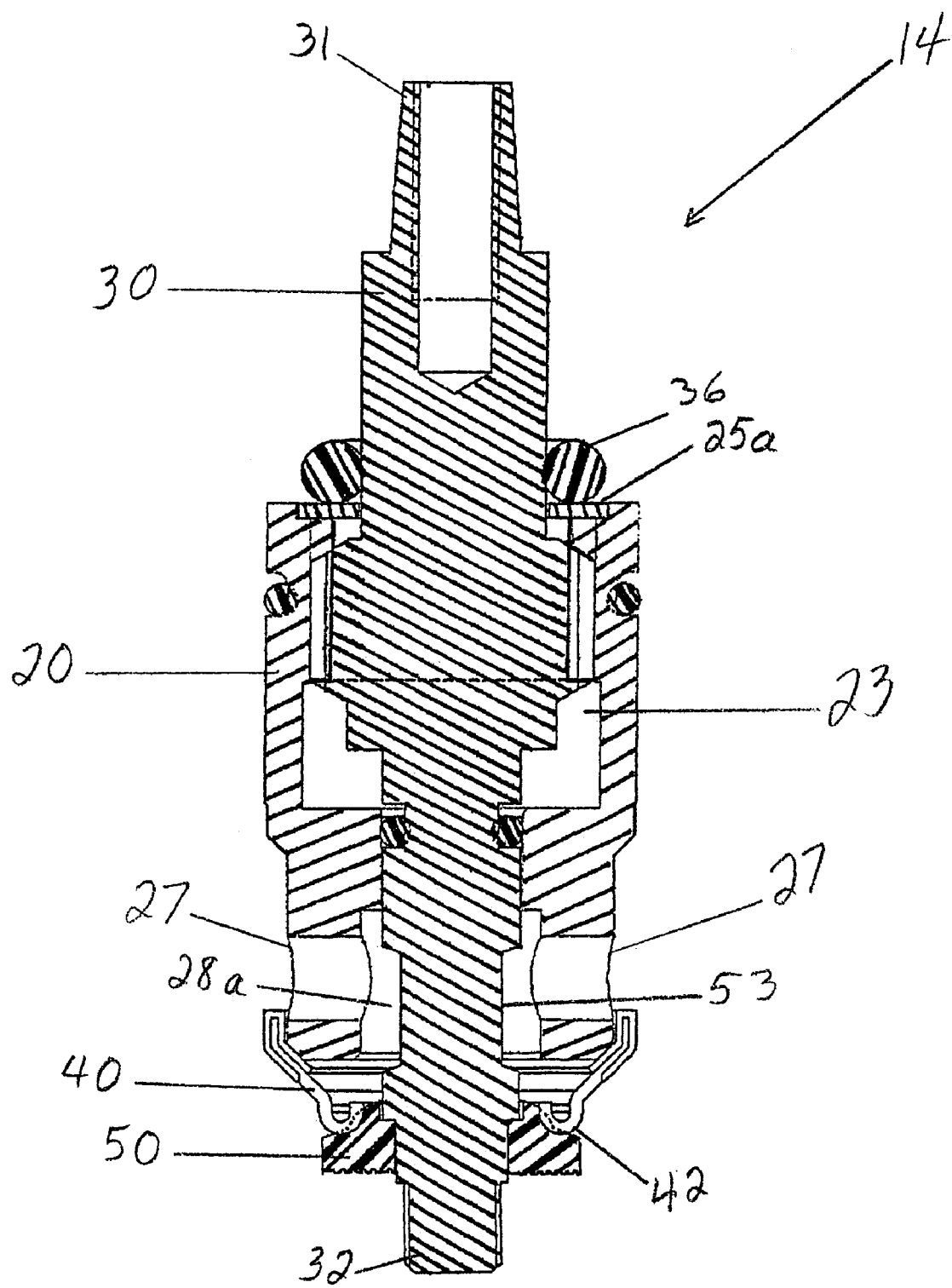
FIG. 3A is a fragmentary, vertical sectional view of an embodiment of the valve cartridge with some structure omitted from the distal end.

As shown in FIG. 3A for example, the valve cartridge 14 comprises a sleeve 20, a valve stem 30, a valve seat 40 and a seal piece 50. The valve seat 40 is shown separately in a detailed vertical cross-sectional view in FIG. 7 for example.

Figure 2B:
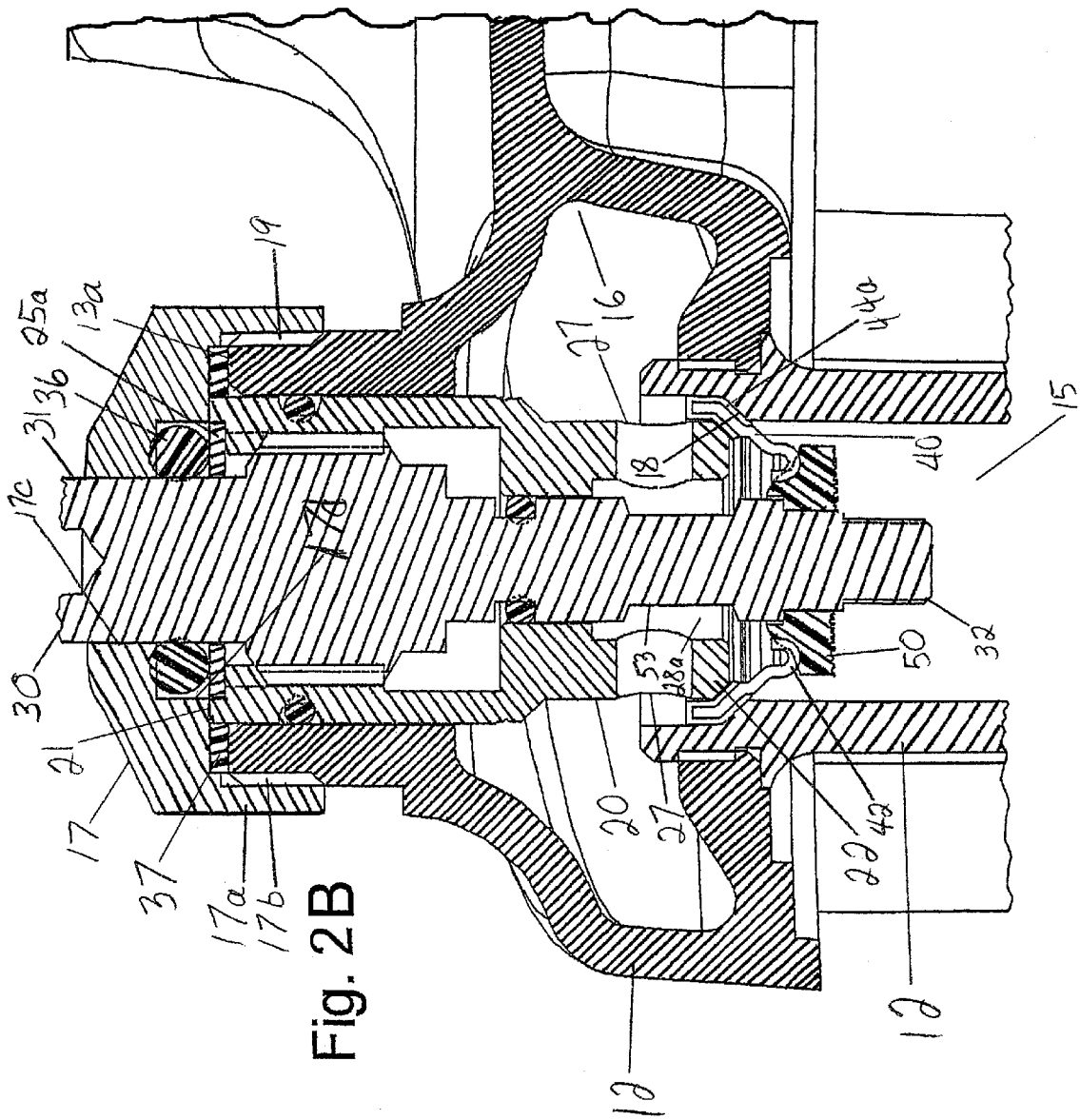
FIG. 2B is yet another different vertical sectional view of the valve of FIG. 1, but enlarged and showing only a portion of what is shown of the valve in FIG. 1.
Figure 3B:
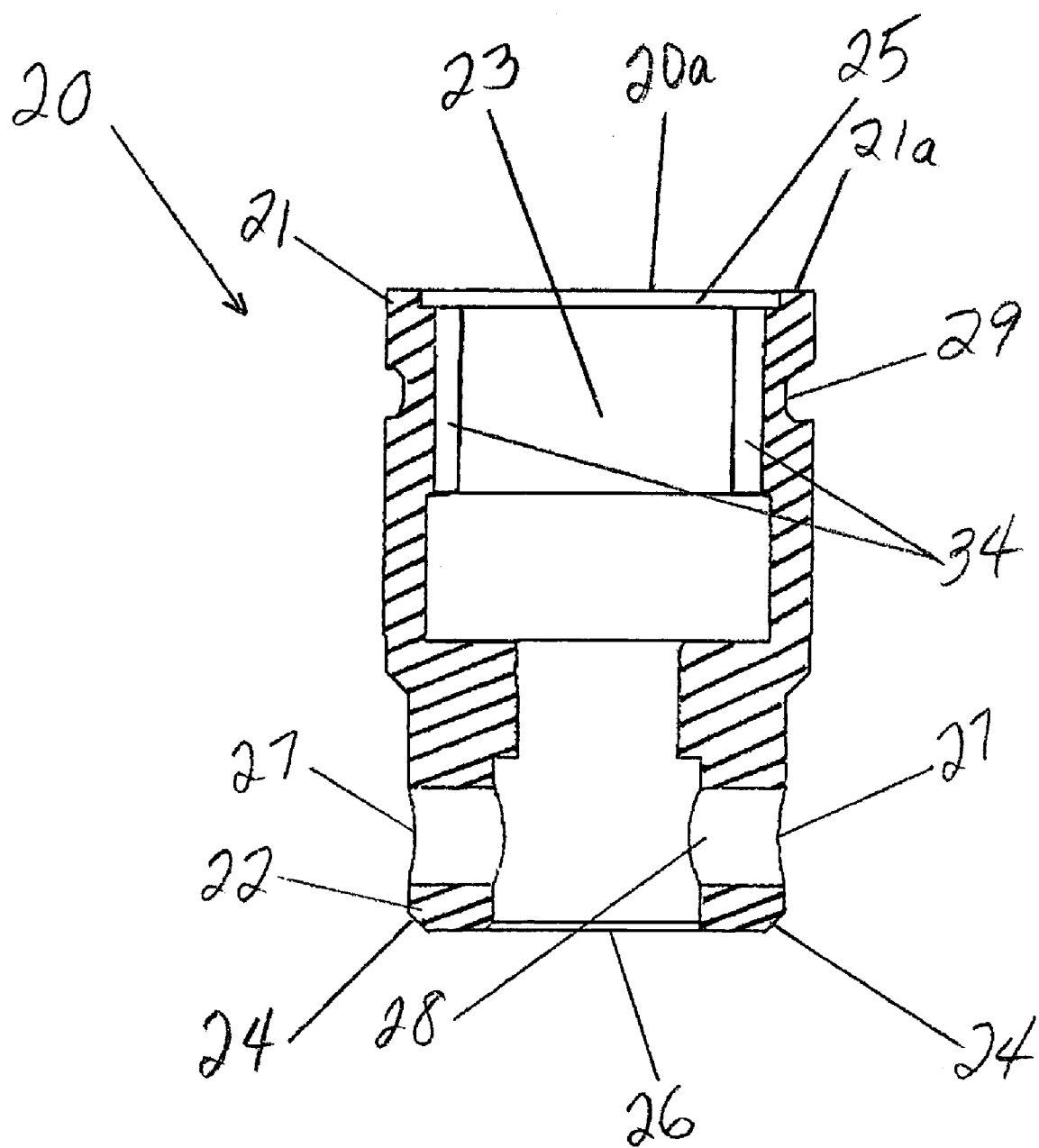
FIG. 3B is a vertical sectional view of an embodiment of the sleeve of the valve cartridge.
Figure 6:
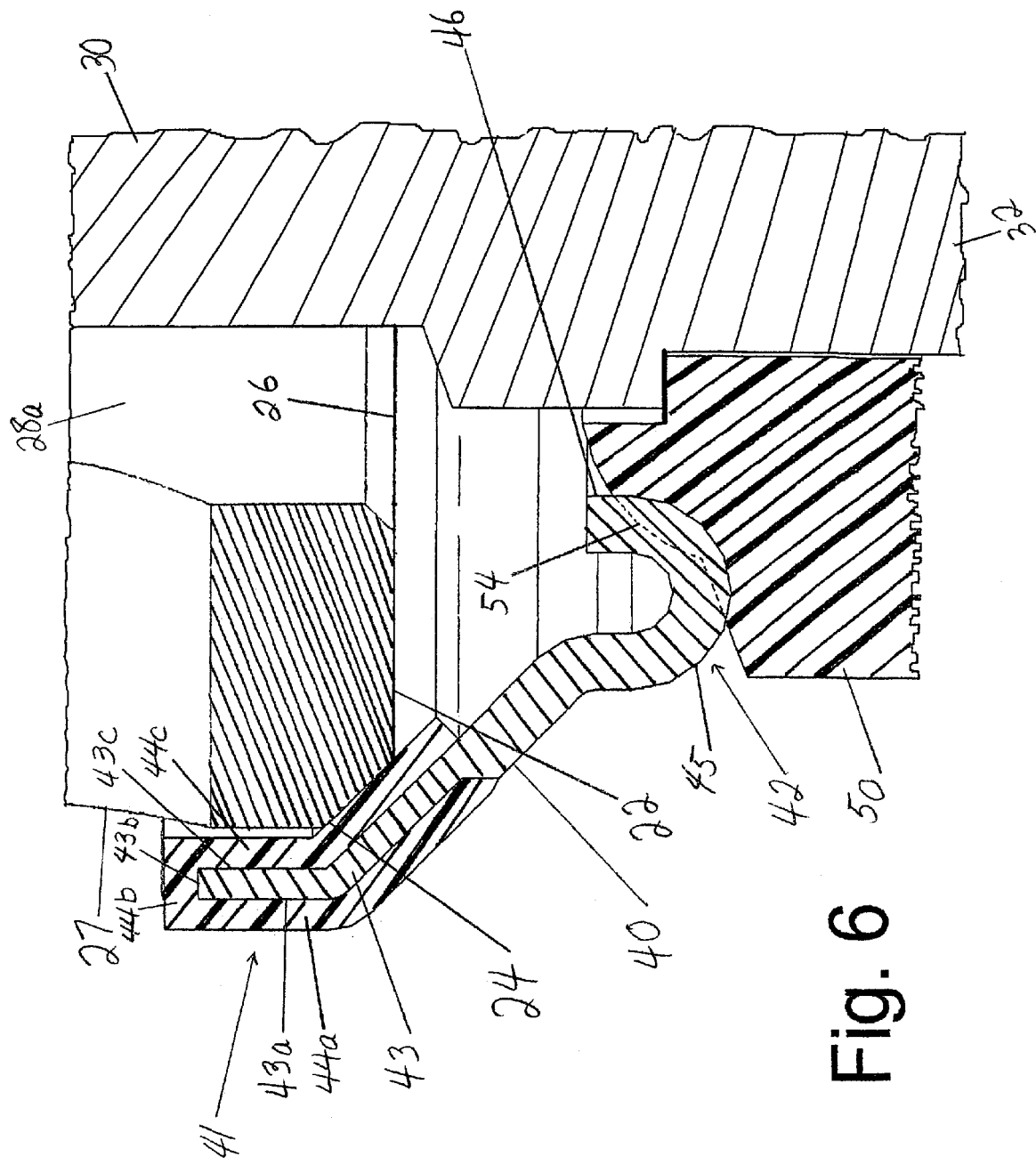
FIG. 6 is an enlargement of a partial fragment of FIG. 5.

As shown in FIG. 3B, the cartridge sleeve 20 is elongated in an axial direction and defines a proximal end 21 and a distal end 22 that is disposed opposite the proximal end in the axial direction. The sleeve 20 defines an opening 20a at the proximal end 21 that is configured to permit insertion of the valve stem 30 therethrough. The sleeve 20 defines an interior channel 23 that extends through the sleeve from the opening 20a in the axial direction. Specifically, the interior channel 23 is defined by the interior surfaces of the walls of the sleeve 20. As shown in FIGS. 3B and 6 for example, the sleeve 20 defines a floating seating surface 24 adjacent a distal end 22 of the sleeve 20. The floating seating surface 24 is configured as a conically shaped, annular band. As shown in FIG. 2B, the sleeve 20 is held fixed relative to the valve housing 12 such as in a waterline of a sink.

Figure 4:
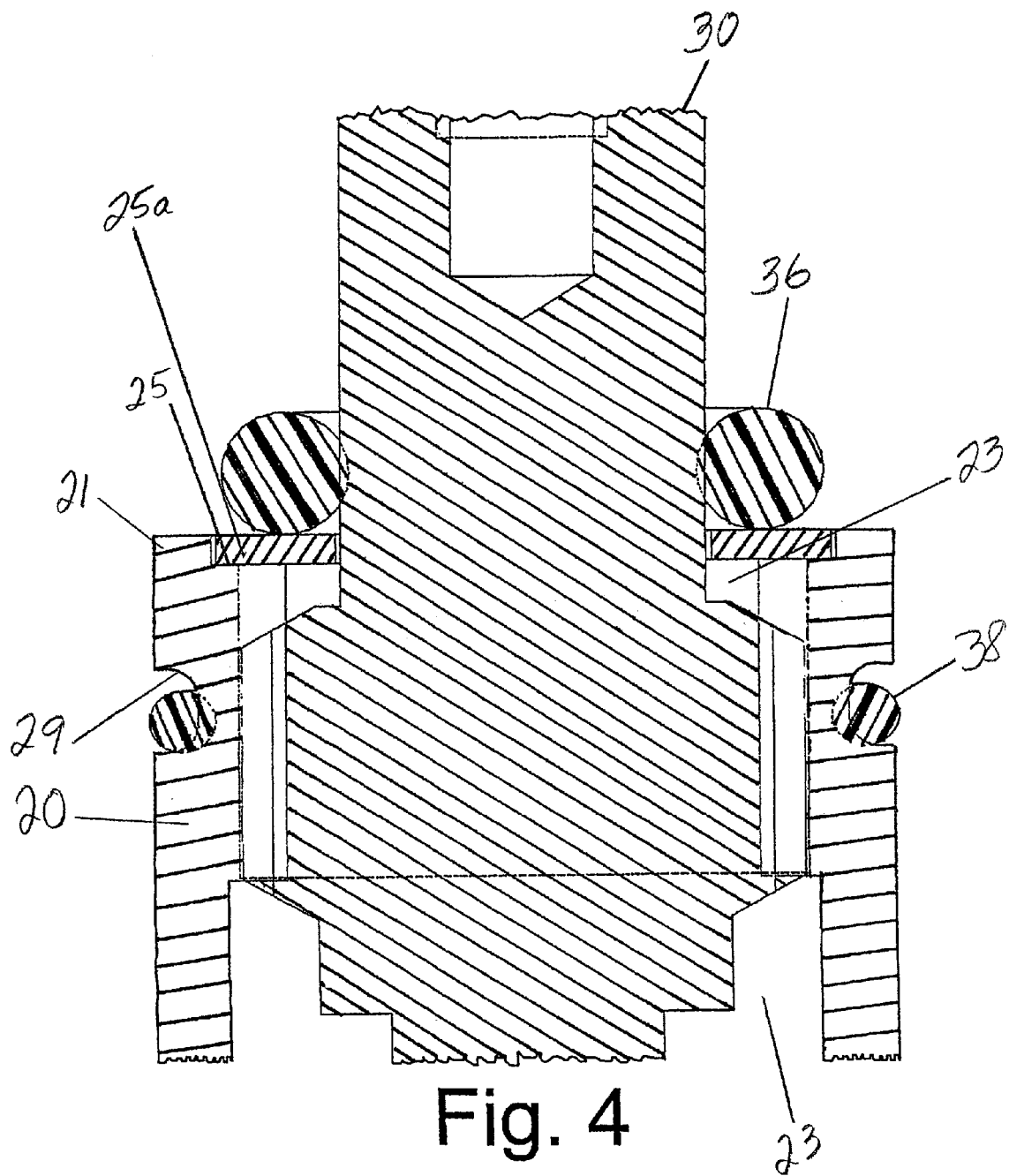
FIG. 4 is an enlarged, vertical sectional view of part of the proximal end of the valve cartridge of FIG. 3A.

As shown in FIGS. 3B and 4 for example, the sleeve 20 defines an annular recess 25 in the proximal end 21 of the sleeve. The annular recess 25 communicates with the interior channel 23 of the sleeve 20. As shown in FIG. 4 for example, a washer 25a is disposed in the annular recess 25 of the cartridge sleeve 20 and desirably is composed of metal such as stainless steel. The axial thickness of the washer 25a desirably is equal to the axial depth of the annular recess 25 of the cartridge sleeve 20.

As shown in FIG. 3B for example, the sleeve 20 defines an entrance 26 for communicating with the valve's inlet 15. The entrance 26 of the sleeve 20 is defined at the distal end 22 of the sleeve 20 and is the opening of the interior channel 23 at the distal end 22 of the sleeve 20. The interior channel 23 extends axially through the sleeve 20 from the opening 20a to the entrance 26. The sleeve 20 defines at least one exit 27 for communicating with the valve's outlet 16. As shown in FIGS. 2B and 3A, there desirably is more than one exit 27. Several exits 27 are disposed transversely through the axially extending walls that define the interior channel 23 at the distal end 22 of the sleeve 20. As shown in FIG. 2B, each exit 27 communicates with the valve's outlet 16. As shown in FIG. 3B for example, the sleeve 20 defines a flow passage 28 that desirably elongates in a direction that is generally transverse to the axial direction. The flow passage 28 of the sleeve 20 connects the entrance 26 of the sleeve 20 to the sleeve's exits 27.

Figure 5:
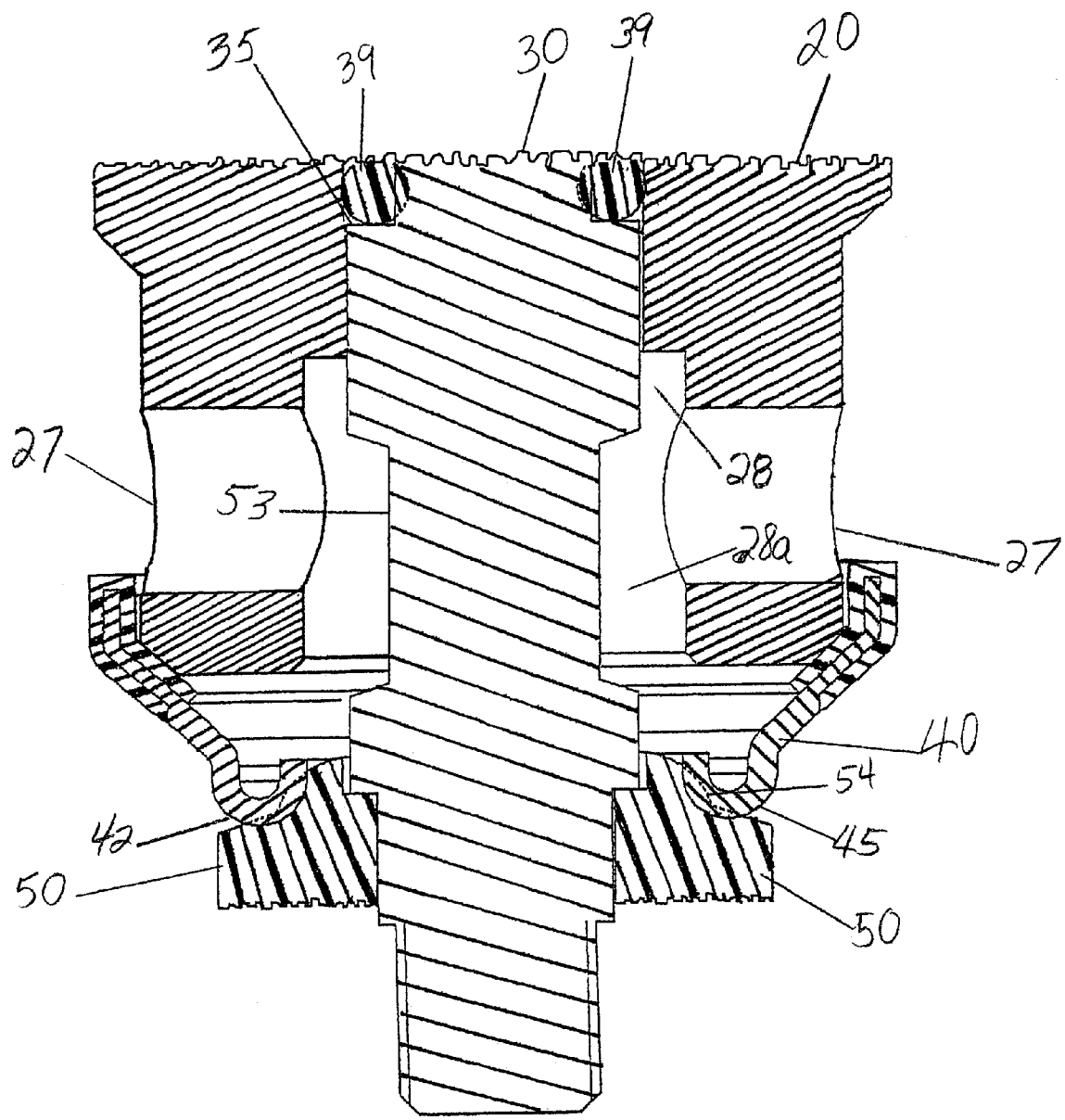
FIG. 5 is an enlarged, vertical sectional view of the distal end of the valve cartridge of FIG. 3A with some structure omitted.

As shown in FIG. 5 for example, the sleeve 20 defines an intermediate portion of the flow passage 28. This intermediate portion of the flow passage 28 desirably forms a plenum 28a that has a larger flow area than the other portions of the flow passage 28 and than each of the sleeve's exits 27.

Figure 3C:
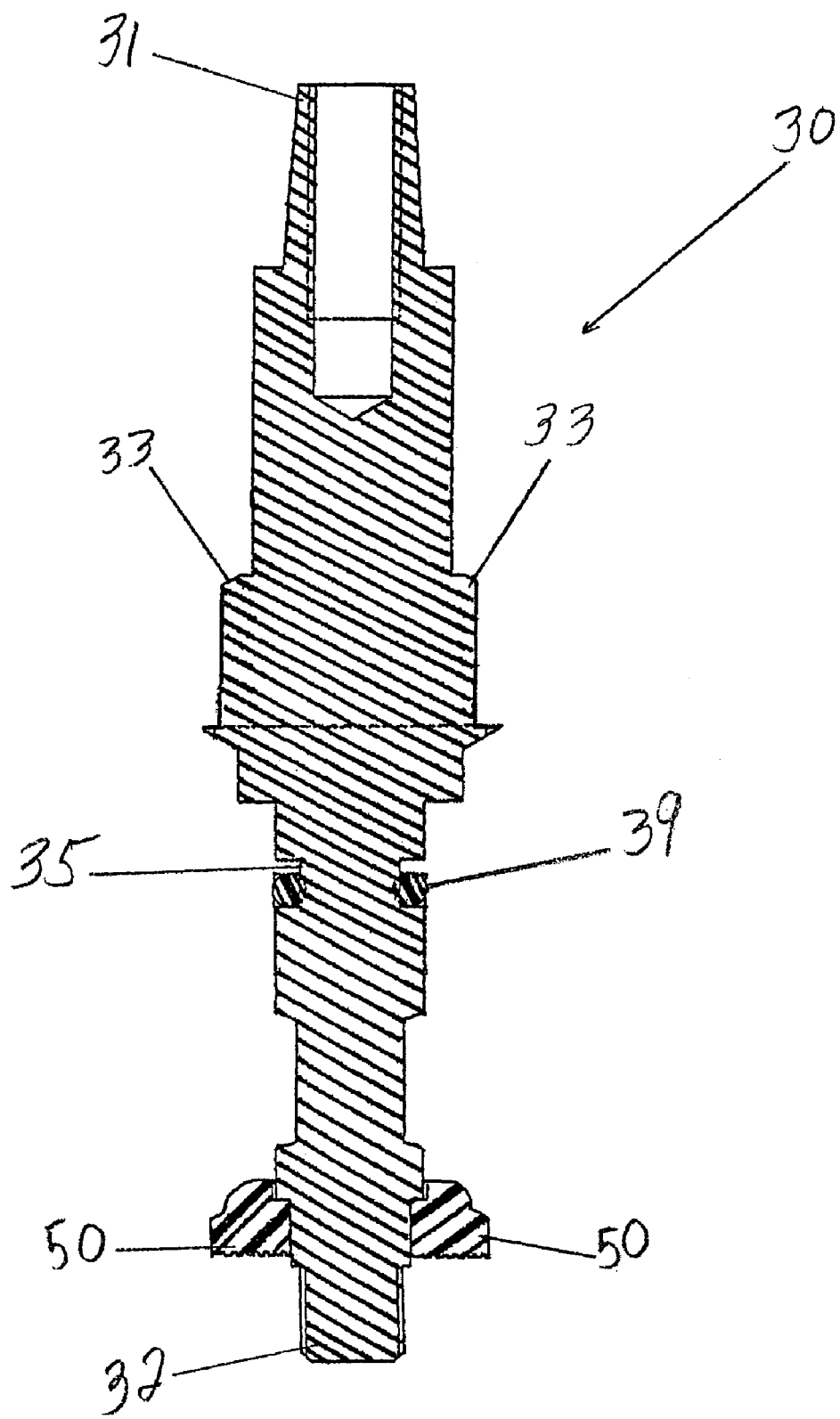
FIG. 3C is a vertical sectional view of embodiments of the valve stem and the valve piece of the valve cartridge.

As shown in FIG. 3C for example, the valve stem 30 defines a proximal end 31 and a distal end 32 that is disposed opposite the proximal end 31 in the axial direction. As shown in FIG. 3A for example, the valve stem 30 is mounted within and extends through the interior channel 23 of the cartridge sleeve 20. A portion of the valve stem 30 has threads 33 that engage mating threads 34 (FIG. 3B) that are defined along a portion of the wall that defines the interior channel 23 of the cartridge sleeve 20. If the cartridge sleeve 20 is held fixed and the valve stem 30 is rotated, then the two sets of mating threads 33, 34 will cause the valve stem 30 to move axially with respect to the cartridge sleeve 20. In this way, the valve stem 30 is rotatably mounted to the elongated cartridge sleeve 20 and can be screwed into and out of the cartridge sleeve 20.

Figure 7:
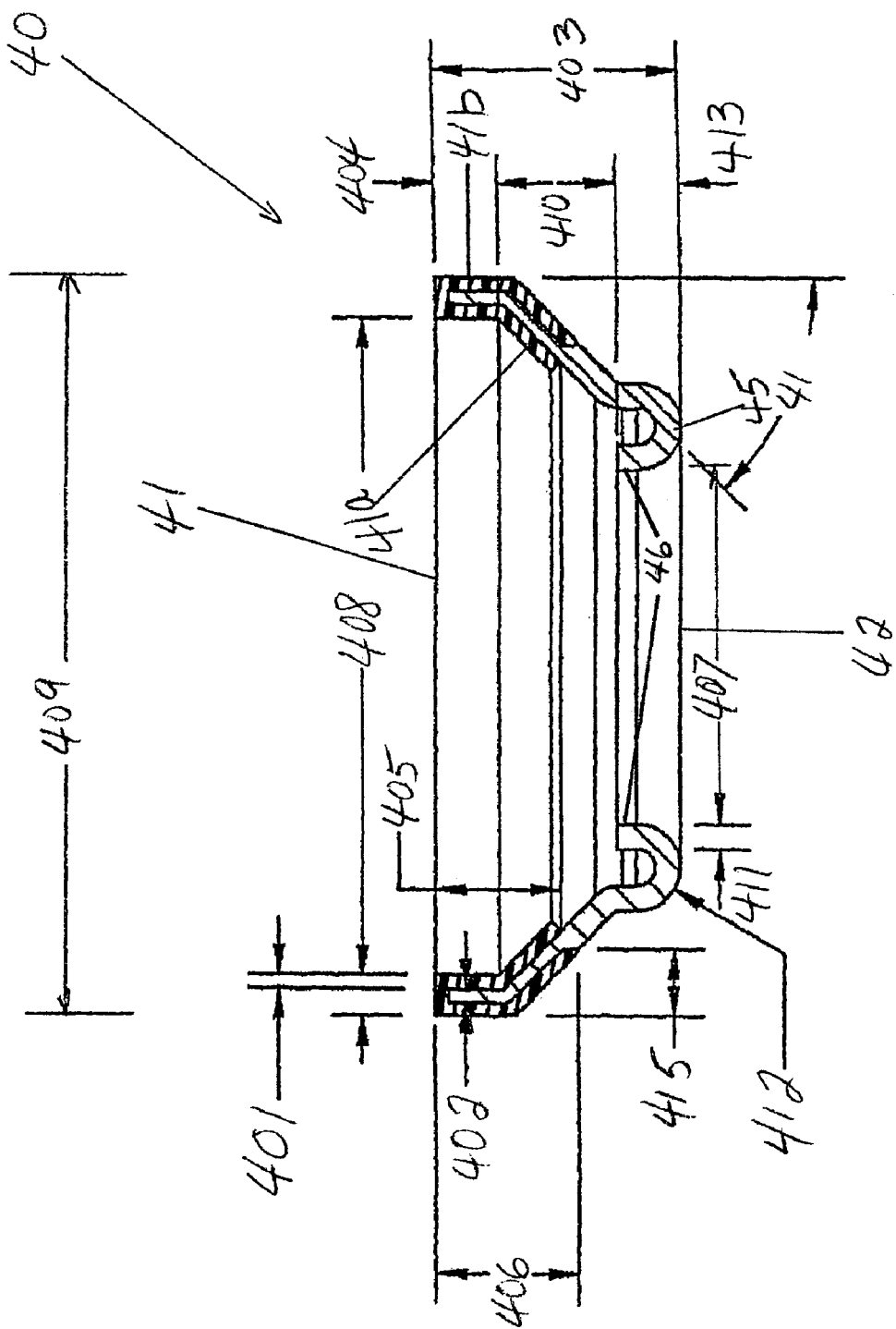
FIG. 7 is a cross-sectional view of an embodiment of the co-molded valve seat component.

As shown in FIG. 7 for example, the valve seat 40 defines a proximal end 41 and a distal end 42 opposite the proximal end. The proximal end 41 of the valve seat 40 defines a conical section 41a and a cylindrical section 41b that extends from the largest diameter portion of the conical section 41a. The interior surface of the proximal end 41 of the valve seat 40 is configured to receive the floating seat 24 that is disposed at the distal end 22 of the cartridge sleeve 20. The distal end 42 of the valve seat 40 defines a curved portion 45 that defines a circular opening 46.

In accordance with the present invention, as shown in FIG. 6 for example, the proximal end 41 of the valve seat 40 includes a tongue 43 that is formed of non-elastomeric material. Desirably, the tongue 43 is formed of metal such as 304 stainless steel or a carbon/resin composite or another fiber/resin composite. The tongue 43 conforms to the shape of the conical section 41a and cylindrical section 41b of the proximal end 41 of the valve seat 40. As shown in FIG. 6 for example, the tongue 43 defines an outer surface 43a, an end surface 43b and an inner surface 43c. The end surface 43b of the tongue 43 is contiguous with the outer surface 43a and the inner surface 43c.

In accordance with the present invention, each of the outer surface 43a, the end surface 43b and the inner surface 43c of the tongue 43 is coated with a layer 44a, 44b, 44c, respectively, of elastomeric material that is permanently adhered or bonded to the tongue 43. The elastomeric material is desirably DURO 70 Shore A ethylene propylene diene monomer (EPDM) that has been approved by the National Sanitation Foundation (NSF). Desirably, the elastomeric layer is co-molded to the surfaces of the tongue 43 to form essentially an unitary structure, as by being chemically bonded so as to Withstand a razor cutting between the rubber and the steel without release of rubber from steel, though the rubber separates from itself.

One presently desired embodiment of the valve seat 40 can be provided with the following dimensions. The thickness of each of the elastomeric layers 44a, 44b, 44c desirably is indicated in FIG. 7 by the numeral 401 and is about fifteen thousandths of an inch. The thickness of the portion of the tongue that is coated with the elastomeric layer is indicated in FIG. 7 by the numeral 402 and is about one hundred forty-eight ten thousandths of an inch, i.e., just under about fifteen thousandths of an inch. The height of the valve seat 40 is indicated in FIG. 7 by the numeral 403 and can be about two hundred sixty-eight thousandths of an inch. The height of the valve seat's cylindrical section 41b at the proximal end 41 is indicated in FIG. 7 by the numeral 404 and can be about sixty-seven thousandths of an inch. The interior height of the valve seat's co-molded section at the proximal end 41 is indicated in FIG. 7 by the numeral 405 and can be about one hundred thirty-seven thousandths of an inch. The exterior height of the valve seat's co-molded section at the proximal end 41 is indicated in FIG. 7 by the numeral 406 and can be about one hundred fifty-six thousandths of an inch. The interior diameter of the opening 46 at the valve seat's distal end 42 is indicated in FIG. 7 by the numeral 407 and can be about three hundred eighty-six thousandths of an inch. The interior diameter of the valve seat's cylindrical section at the proximal end 41 is indicated in FIG. 7 by the numeral 408 and can be about (plus or minus four thousandths of an inch) seven hundred twenty-one thousandths of an inch. The exterior diameter of the valve seat's cylindrical section 41b is indicated in FIG. 7 by the numeral 409 and can be about eight hundred ten thousandths of an inch. The height of the valve seat's conical portion 41a is indicated in FIG. 7 by the numeral 410 and can be about one hundred thirty-two thousandths of an inch. The thickness of the curved portion 45 at the distal end 42 of the valve seat 40 is indicated in FIG. 7 by the numeral 411 and can be about twenty-eight thousandths of an inch. The radius of the curved portion 45 at the distal end 42 of the valve seat 40 is indicated in FIG. 7 by the numeral 412 and can be about forty-eight thousandths of an inch. The height of the valve seat's curved portion 45 is indicated in FIG. 7 by the numeral 413 and can be about sixty-nine thousandths of an inch. The angle of the conical portion 41a at the proximal end 41 of the valve seat 40 is indicated in FIG. 7 by the numeral 414 and can be about forty-five degrees. The radial length of theconical portion 41a at the proximal end 41 of the valve seat 40 is indicated in FIG. 7 by the numeral 415 and can be about seventy-four thousandths of an inch.

As shown in FIGS. 1, 2A and 2B, the valve includes a bonnet that 17 is selectively, removably connected to the valve housing 12. The bonnet 17 has a depending cylindrically shaped annular wall. As shown in FIGS. 2A and 2B, the interior surface of this depending cylindrically shaped annular wall 17a of the bonnet 17 is provided with threads 17b that are configured to mate with threads 19 that are formed on the exterior of the proximal end of the valve housing 12. As shown in FIG. 2B, the bonnet 17 defines a central opening 17c through which extends the proximal section 31 of the valve stem 30. As shown in FIG. 2A, the bonnet 17 defines an annular groove 17d in the underside of the bonnet, and the groove 17d is configured and disposed so as to be in communication with the central opening 17c of the bonnet 17.

As shown in FIG. 2B, a flexible, deformable sealing gasket 36 is disposed in the annular groove 17d of the bonnet 17 and between the washer 25a and the bonnet 17. The gasket 36 desirably is an O-ring that is configured to seal around the valve stem 30. Gasket 36 is depicted in FIG. 2B as spilling over the edge of the wall in the bonnet 17 and the edge of the valve stem 30 so as to indicate schematically that the uncompressed state of the gasket 36 would fill those volumes were it not for the rigidity of those containing surfaces. The washer 25a provides a rigid seat for the rubber O-ring 36 that can be compressed between the washer 25a and the bonnet 17 so as to expand against the valve stem 30 and thereby prevent leakage around the valve stem 30. Thus, in the cartridge 14, the washer 25a functions to help prevent leakage around the valve stem 30.

As shown in FIG. 2B for example, a flat, annular gasket 37 desirably is disposed between the proximal edge 13a of the valve housing 12 and the underside of the bonnet 17. As the bonnet 17 is screwed onto the proximal end of the valve housing 12, the underside of the bonnet 17 compresses the O-ring 36 and frictionally engages the proximal edge 21*a* (FIG. 3B) of the proximal end 21 of the cartridge sleeve 20 while forcing the floating seat 24 at the distal end 22 of the cartridge sleeve 20 into the interior of the proximal end of the valve seat 40 and forcing the co-molded conical section 41*a* of the proximal end of the valve seat 40 into a floating sealing engagement with the cartridge seat 18 of the valve housing 12. Each turn of the bonnet 17 moves the cartridge sleeve 20 further into the valve housing 12 towards the cartridge seat 18 and increasingly deforms the co-molded exterior of the valve seat 40 against the cartridge seat 18. Thus, the cartridge 14 has a floating seal arrangement with the valve housing 12 rather than a static seal arrangement. The deformations of the elastomeric layers 44*a*, 44*c* of the co-molded valve seat 40 depend on the degree to which the bonnet 17 of the valve housing 12 is torqued.

As shown in FIG. 6 for example, the floating seat 24 at the distal end 22 of the cartridge sleeve 20 is received against a portion of the elastomeric layer 44*c* that is coating the inner surface 43*c* of the tongue 43 of the proximal end 41 of the valve seat 40. As shown in FIG. 2B for example, a portion of the elastomeric layer 44*a* that is coating the outer surface of the tongue of the proximal end of the valve seat 40 is configured to be received against and deformed into sealing engagement with the cartridge seat 18 of the valve housing 12 so as to provide a floating sealing engagement with the cartridge seat 18. This portion of the elastomeric layer 44*a* on the outer surface of the tongue of the proximal end of the valve seat 40 cooperates with the cartridge seat 18 in order to provide part of a water-tight seal between the inlet 15 and outlet 16 of the valve housing 12.

In this sealing arrangement, the location of the sealing surfaces on the co-molded conical section 41*a* of the proximal end 41 of the valve seat 40 are permitted to float and self-adjust before they are settled against the cartridge seat 18 and the floating seat 24 in a static seal. Thus, this sealing arrangement is known as a floating seal arrangement. In this floating seal arrangement, the tolerances of the cartridge's floating seat 24 and the housing's cartridge seat 18 need not be as closely controlled as with a conventional static sealing arrangement. In this floating seal arrangement, the degree of deformation of the co-molded conical section 41*a* of the proximal end 41 of the valve seat 40 against the cartridge seat 18 will vary with the amount of torque that is applied to the bonnet 17.

There are frictional forces between the bonnet 17 and the proximal edge 21*a* at the proximal end 21 of the cartridge sleeve 20. There are frictional forces between the floating seat 24 at the distal end 22 of the cartridge sleeve 20 and the interior surface of the elastomeric layer 44*c* of the proximal end of the valve seat 40. There are frictional forces between the exterior surface of the elastomeric layer 44*a* of the proximal end of the valve seat 40 and the cartridge seat 18. The combined effect of these frictional forces suffices to resist the torque that is needed to rotate the valve stem 30 via the handle 11 (FIG. 1) when the user opens and closes the valve 10. Accordingly, when the valve stem 30 is rotated via the handle of the valve 10, then the elongated cartridge sleeve 20 remains stationary relative to the valve body 12. Thus, when the bonnet 17 is tightened, the bonnet/sleeve, metal-to-metal interface and the co-molded portions 44*a*, 44*c* of the valve seat 40 generate friction sufficient to lock the cartridge sleeve 20 to the valve housing 12 so that the sleeve 20 does not rotate with respect to the housing 12 when the valve stem 30 is being rotated.

As shown in FIGS. 3B and 4 for example, a circumferentially extending groove 29 is desirably defined in the exterior of the proximal section 21 of the cartridge sleeve 20. As shown in FIG. 4, an O-ring gasket 38 desirably is disposed in the circumferential groove 29 and provides a sealing gasket between the interior wall of the valve housing 12 and the exterior of the cartridge sleeve 20. Gasket 38 is depicted in FIG. 4 as spilling over the edge of the wall defining the groove 29 so as to indicate schematically that the uncompressed state of the gasket 36 would fill those volumes were it not for the rigidity of the wall defining the groove 29. As shown in FIGS. 3C and 5 for example, a circumferentially extending cut-out 35 is desirably defined in the exterior of the intermediate section of the valve stem 30. An O-ring gasket 39 desirably is disposed in the circumferential cut-out 35 of the valve stem and provides a sealing gasket between the interior wall of the cartridge sleeve 20 and the exterior wall of the valve stem 30. Gasket 39 is depicted in FIGS. 3C and 5 as spilling over the edge of the wall defining the cut-out 35 of the valve stem so as to indicate schematically that the uncompressed state of the gasket 36 would fill those volumes were it not for the rigidity of the wall defining the cut-out 35 of the valve stem. This O-ring gasket 39 that is disposed in the circumferential cut-out 35 of the valve stem 30 desirably does not reach the plenum 28*a* of the cartridge sleeve 20 when the valve 10 is fully open and thus prevents flow into the proximal portion of the interior channel 23 of the cartridge sleeve 20.

The deformability of the gaskets 36, 38, 39 is indicated by the dashed lines that define the non-deformed outline of the gaskets in their unstretched states.

As shown in FIG. 3C for example, the valve seal piece 50 is mounted on the distal end of the valve stem 30 and is configured for engagement with the distal end of the valve seat 40. As shown in FIG. 6, the seal piece 50 is resiliently deformed and is engaged with the curved portion 45 at the distal end 42 of the valve seat 40 only in the closed position for preventing flow through the entrance 26 of the sleeve 20 and into the plenum 28*a* of the passage 28 of the sleeve 20. The dashed line designated 54 in FIG. 6 schematically indicates the non-deformed surface of the seal piece 50 when the curved portion 45 of the valve seat 40 is disengaged from the seal piece 50, as when the valve 10 is open. In order to avoid unduly cluttering the drawings, only part of the seal piece 50 and distal end 32 of the valve stem 30 are shown in each of FIGS. 2B, 3A, 3C, 5 and 6. As shown in FIG. 1, the seal piece 50 is held in place by a retainer 51 and a nut 52 that is screwed onto the distal end 32 of the valve stem 30. When it is desired to replace a worn seal piece 50, then the nut 52 can be removed along with the retainer 51.

As shown in FIGS. 1 and 5 for example, a portion 53 of the valve stem 30 that is mounted within the cartridge sleeve 20 has a reduced diameter. This reduced diameter portion 53 of the valve stem 30 is disposed to extend through the intermediate portion of the sleeve's flow passage 28 that defines the sleeve's plenum 28*a*. The axial movement of the valve stem 30 relative to the sleeve 20 causes the valve stem 30 to move axially between a closed position of the valve and an open position of the valve. In the open position of the valve, the reduced diameter portion 53 of the valve stem 30 moves past the distal end 42 of the valve seat 40 so as to permit flow past the seal piece 50 and the distal end 42 of the valve seat 40 and between the distal end 42 of the valve seat 40 and the reduced diameter portion 53 of the valve stem 30 and through the entrance 26 of the cartridge sleeve 20 and into the plenum 28*a* of the cartridge sleeve 20.

As shown in FIG. 1, the valve stem 30 is connected to a knob or handle 11 of the sink or other device to which the cartridge 14 is attached. Rotation of the handle 11 or knob by a user will cause a corresponding rotation of the valve stem 30. As the valve stem 30 is screwed into the cartridge sleeve 20, the valve stem 30 will move longitudinally relative to the cartridge sleeve 20 such that the seal piece 50 (FIG. 6) will move out of contact with the distal end 42 of the co-molded valve seat 40 and thereby permit flow between the inlet of the cartridge 14 and the exits 27 of the cartridge 14. The inlet of the cartridge 14 is the path that is defined by the exterior surface of the reduced diameter portion 53 of the valve stem 30 and the opening 46 at the curved portion 45 of the distal end 42 of the valve seat 40.

When the valve 10 is opened, water will flow into the inlet of the cartridge 14 and out of the exits 27 in the sleeve 20 of the cartridge 14 and thence through the outlet 16 of the valve housing 12. See FIG. 2B for example. The cartridge 14 is designed so as to control the flow of water therethrough such that the cartridge 14 is capable of being selectively moved into both an opened and closed position in order to allow and prevent, as desired, water flow through the cartridge and thereby between the inlet 15 and outlet 16 of the valve housing 12.

While at least one presently preferred embodiment of the invention has been described using specific terms, such description is for illustrative purposes only, and it is to be understood that changes and variations may be made without departing from the spirit or scope of the following claims.

What is claimed is:

1. A faucet valve cartridge for controlling flow through a valve housing, the latter having an inlet, an outlet and defining a cartridge seat, the cartridge seat being interposed between the inlet and outlet and for cooperating with a portion of said cartridge to provide a seal between the inlet and outlet, said cartridge comprising:
   a sleeve elongating in an axial direction, said sleeve defining a proximal end and a distal end disposed opposite said proximal end in said axial direction, said sleeve defining a floating seating surface adjacent a distal end of said sleeve, said sleeve defining an entrance for communicating with the inlet of the valve housing, said sleeve defining an exit for communicating with the outlet of the valve housing, said sleeve defining a flow passage elongating in a direction generally transverse to said axial direction and connecting said entrance and said exit;
   a valve stem mounted within said sleeve and being longitudinally movable between a closed position and an open position, said stem defining a proximal end and a distal end disposed opposite said proximal end in said axial direction;
   a valve seat defining a proximal end and a distal end opposite said proximal end, the proximal end of the valve seat including a tongue, said tongue of the proximal end of the valve seat being encased within an elastomeric layer, the floating seat at the distal end of the cartridge body being received against a portion of said elastomeric layer of said proximal end of the valve seat so as to provide a floating sealing engagement with the valve seat, a portion of said elastomeric layer of said proximal end of the valve seat being configured to be received against and deformed into sealing engagement with the cartridge seat of the valve housing so as to provide a floating sealing engagement with the cartridge seat; and
   a seal piece mounted on said distal end of said valve stem and configured for engagement with said distal end of said valve seat, said seal piece being selectively engageable with said distal end of said valve seat in said closed position for preventing flow to said passage.

2. A faucet valve cartridge for controlling flow through a valve housing, the latter having an inlet, an outlet and defining a cartridge seat, the cartridge seat being interposed between the inlet and outlet and for cooperating with a portion of said cartridge to provide a seal between the inlet and outlet, said cartridge comprising:
   a sleeve elongating in an axial direction, said sleeve defining a proximal end and a distal end disposed opposite said proximal end in said axial direction, said sleeve defining a floating seating surface adjacent a distal end of said sleeve, said sleeve defining an entrance for communicating with the inlet, said sleeve defining an exit for communicating with the outlet, said sleeve defining a flow passage elongating in a direction generally transverse to said axial direction and connecting said entrance and said exit;
   a stem mounted within said sleeve and being longitudinally movable between a closed position and an open position, said stem defining a proximal end and a distal end disposed opposite said proximal end in said axial direction;
   a valve seat defining a proximal end and a distal end opposite said proximal end, the proximal end of the valve seat defining a conical section and a cylindrical section extending from the largest diameter portion of the conical section, the proximal end of the valve seat including a metal tongue that defines an outer surface, an end surface and an inner surface, said end surface being contiguous with said outer surface and said inner surface, said outer surface of said tongue being coated with an outer elastomeric layer, said inner surface of said tongue being coated with an inner elastomeric layer, and said end surface of said tongue being coated with an end elastomeric layer, the floating sealing surface of said distal end of the cartridge body being received against a portion of said elastomeric layer that is coating the inner surface of said tongue of said proximal end of the valve seat so as to provide a floating sealing engagement with the valve seat, a portion of said elastomeric layer that is coating the outer surface of said tongue of said proximal end of the valve seat being configured to be received against and deformed into sealing engagement with the cartridge seat of the valve body so as to provide a floating sealing engagement with the cartridge seat; and
   a seal piece mounted on said distal end of said valve stem and configured for engagement with said distal end of said valve seat, said seal piece being engaged with said distal end of said valve seat only in said closed position for preventing flow to said passage.

3. A faucet valve for controlling flow through a faucet, comprising:
   a valve housing and a valve cartridge, said valve cartridge being at least partially disposed within said valve housing;
   said valve housing defining an inlet, an outlet and a cartridge seat, the cartridge seat being interposed between the inlet and outlet and for cooperating with a portion of said cartridge to provide a seal between the inlet and outlet, said cartridge comprising a sleeve, a valve stem, a seal piece and a valve seat;
   said cartridge sleeve being elongated in an axial direction, said sleeve defining a proximal end and a distal end disposed opposite said proximal end in said axial direction, said sleeve defining a floating seating surface adjacent a distal end of said sleeve, said sleeve defining an entrance for communicating with the inlet, said sleeve defining an exit for communicating with the outlet, said sleeve defining a flow passage elongating in a direction generally transverse to said axial direction and connecting said entrance and said exit;

said valve stem being mounted within said sleeve and being longitudinally movable between a closed position and an open position, said stem defining a proximal end and a distal end disposed opposite said proximal end in said axial direction;

said valve seat defining a proximal end and a distal end opposite said proximal end, said proximal end of said valve seat being co-molded with an elastomeric layer that define an interior surface and an exterior surface disposed opposite said interior surface, the floating seating surface of the distal end of the cartridge body being received against said interior surface of said proximal end of the valve seat in a floating sealing engagement therewith, a portion of said exterior surface of said proximal end of the valve seat being received against and deformed into sealing engagement with the cartridge seat of the valve body so as to provide a floating sealing engagement with the cartridge seat; and said valve seal piece being mounted on said distal end of said stem and configured for sealing engagement with said distal end of said valve seat, said seal piece being engaged with said distal end of said valve seat only in said closed position for preventing flow to said passage.

4. A faucet valve for controlling flow through a faucet, comprising:

a valve housing and a valve cartridge, said valve cartridge being at least partially disposed within said valve housing;

said valve housing defining an inlet, an outlet and a cartridge seat, the cartridge seat being interposed between the inlet and outlet and for cooperating with a portion of said cartridge to provide a seal between the inlet and outlet, said cartridge comprising a sleeve, a valve stem, a seal piece and a valve seat;

said cartridge sleeve being elongated in an axial direction, said sleeve defining a proximal end and a distal end disposed opposite said proximal end in said axial direction, said sleeve defining a floating seating surface adjacent a distal end of said sleeve, said sleeve defining an entrance for communicating with the inlet, said sleeve defining an exit for communicating with the outlet, said sleeve defining a flow passage elongating in a direction generally transverse to said axial direction and connecting said entrance and said exit;

said valve stem being mounted within said sleeve and being longitudinally movable between a closed position and an open position, said stem defining a proximal end and a distal end disposed opposite said proximal end in said axial direction;

said valve seat defining a proximal end and a distal end opposite said proximal end, the proximal end of the valve seat defining a conical section and a cylindrical section extending from the largest diameter portion of the conical section, the proximal end of the valve seat including a non-elastomeric tongue, said tongue of the proximal end of the valve seat being encased within an elastomeric layer, the distal end of the cartridge body being received against a portion of said elastomeric layer of said proximal end of the valve seat, a portion of said elastomeric layer of said proximal end of the valve seat being configured to be received against and deformed into sealing engagement with the cartridge seat of the valve body so as to provide a floating sealing engagement with the cartridge seat; and said valve seal piece being mounted on said distal end of said stem and configured for engagement with said distal end of said valve seat, said seal piece being engaged with said distal end of said valve seat only in said closed position for preventing flow to said passage.

5. A faucet valve for controlling flow through a faucet, comprising:

a valve housing and a valve cartridge, said valve cartridge being at least partially disposed within said valve housing;

said valve housing defining an inlet, an outlet and a cartridge seat, the cartridge seat being interposed between the inlet and outlet and for cooperating with a portion of said cartridge to provide a seal between the inlet and outlet, said cartridge comprising a sleeve, a valve stem, a seal piece and a valve seat;

said cartridge sleeve being elongated in an axial direction, said sleeve defining a proximal end and a distal end disposed opposite said proximal end in said axial direction, said sleeve defining a floating seating surface adjacent a distal end of said sleeve, said sleeve defining an entrance for communicating with the inlet, said sleeve defining an exit for communicating with the outlet, said sleeve defining a flow passage elongating in a direction generally transverse to said axial direction and connecting said entrance and said exit;

said valve stem being mounted within said sleeve and being longitudinally movable between a closed position and an open position, said stem defining a proximal end and a distal end disposed opposite said proximal end in said axial direction;

said valve seat defining a proximal end and a distal end opposite said proximal end, the proximal end of the valve seat defining a conical section and a cylindrical section extending from the largest diameter portion of the conical section, the proximal end of the valve seat including a metal tongue that defines an outer surface, an end surface and an inner surface, said end surface being contiguous with said outer surface and said inner surface, each of said outer surface, inner surface and end surface of said tongue being coated with an elastomeric layer, the distal end of the cartridge body being received against a portion of said elastomeric layer that is coating the inner surface of said tongue of said proximal end of the valve seat, a portion of said elastomeric layer that is coating the outer surface of said tongue of said proximal end of the valve seat being configured to be received against and deformed into sealing engagement with the cartridge seat of the valve body so as to provide a floating sealing engagement with the cartridge seat; and said valve seal piece being mounted on said distal end of said stem and configured for engagement with said distal end of said valve seat, said seal piece being engaged with said distal end of said valve seat only in said closed position for preventing flow to said passage.

6. A faucet valve for controlling flow through a faucet, comprising:

a valve housing, a bonnet and a valve cartridge, said valve cartridge being at least partially disposed within said valve housing;

said valve housing defining an inlet, an outlet and a cartridge seat, the cartridge seat being interposed between the inlet and outlet and for cooperating with a portion of said cartridge to provide a seal between the inlet and outlet, said cartridge comprising a sleeve, a valve stem, a seal piece and a valve seat;

said cartridge sleeve being elongated in an axial direction and defining an interior channel extending through said sleeve in said axial direction, said sleeve defining a proximal end and a distal end disposed opposite said proximal end in said axial direction, said sleeve defining an annular recess in said distal end, said annular recess communicating with said interior channel, said sleeve defining a floating seating surface adjacent a distal end of said sleeve, said sleeve defining an entrance for communicating with the inlet, said sleeve defining an exit for communicating with the outlet, said sleeve defining a flow passage elongating in a direction generally transverse to said axial direction and connecting said entrance and said exit;

said bonnet being selectively, removably connected to said valve housing, said bonnet defining a central opening, said bonnet defining an annular groove disposed in communication with said central opening;

said valve stem being mounted within said interior channel of said sleeve and projecting through said central opening of said bonnet, said valve stem being axially movable between a closed position and an open position, said stem defining a proximal end and a distal end disposed opposite said proximal end in said axial direction;

a washer disposed in said annular recess of said cartridge sleeve;

a flexible gasket disposed in said annular groove of said bonnet and between said washer and said bonnet, said gasket being configured to seal around said valve stem;

said valve seat defining a proximal end and a distal end opposite said proximal end, the proximal end of the valve seat defining a conical section and a cylindrical section extending from the largest diameter portion of the conical section, the proximal end of the valve seat including a metal tongue that defines an outer surface, an end surface and an inner surface, said end surface being contiguous with said outer surface and said inner surface, each of said outer surface, inner surface and end surface of said tongue being coated with an elastomeric layer, the distal end of the cartridge body being received against a portion of said elastomeric layer that is coating the inner surface of said tongue of said proximal end of the valve seat, a portion of said elastomeric layer that is coating the outer surface of said tongue of said proximal end of the valve seat being configured to be received against and deformed into sealing engagement with the cartridge seat of the valve body so as to provide a floating sealing engagement with the cartridge seat; and said valve seal piece being mounted on said distal end of said stem and configured for engagement with said distal end of said valve seat, said seal piece being engaged with said distal end of said valve seat only in said closed position for preventing flow to said passage.

* * * * *